United States Patent [19]
Colt

[11] Patent Number: 6,123,758
[45] Date of Patent: Sep. 26, 2000

[54] INK COMPOSITIONS CONTAINING UNDECYLENOYL SARCOSINATE SALTS

[75] Inventor: Richard L. Colt, Rochester, N.Y.

[73] Assignee: Xerox Corporation, Stamford, Conn.

[21] Appl. No.: 09/399,027

[22] Filed: Sep. 22, 1999

[51] Int. Cl.[7] .................................................. C09D 11/00

[52] U.S. Cl. ..................................... 106/31.43; 106/31.75

[58] Field of Search .............................. 106/31.43, 31.75, 106/31.58, 31.86

[56] References Cited

U.S. PATENT DOCUMENTS

| | | | |
|---|---|---|---|
| 5,080,716 | 1/1992 | Aoki et al. | 106/20 |
| 5,380,358 | 1/1995 | Aoki et al. | 106/20 R |
| 5,462,592 | 10/1995 | Murakami et al. | 106/22 R |
| 5,601,023 | 2/1997 | Hale et al. | 101/488 |

*Primary Examiner*—Mark L. Bell
*Assistant Examiner*—Veronica F. Faison
*Attorney, Agent, or Firm*—Judith L. Byorick

[57] ABSTRACT

Disclosed is an ink composition comprising water, a colorant, and an undecylenoyl sarcosinate salt.

20 Claims, No Drawings

INK COMPOSITIONS CONTAINING UNDECYLENOYL SARCOSINATE SALTS

BACKGROUND OF THE INVENTION

The present invention is directed to ink compositions and to methods for the use thereof. More specifically, the present invention is directed to ink compositions suitable for use in ink jet printing processes. One embodiment of the present invention is directed to an ink composition comprising water, a colorant, and an undecylenoyl sarcosinate salt.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

Another type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in, for example, U.S. Pat. Nos. 4,601,777, 4,251,824, 4,410,899, 4,412,224, and U.S. Pat. No. 4,532,530, the disclosures of each of which are totally incorporated herein by reference.

Acoustic ink jet printing processes are also known. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. These principles have been applied to prior ink jet and acoustic printing proposals. For example, K. A. Krause, "Focusing Ink Jet Head," *IBM Technical Disclosure Bulletin,* Vol. 16, No. 4, September 1973, pp. 1168–1170, the disclosure of which is totally incorporated herein by reference, describes an ink jet in which an acoustic beam emanating from a concave surface and confined by a conical aperture was used to propel ink droplets out through a small ejection orifice. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure which each of the beams exerts against the free ink surface to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop on demand and continuous stream ink jet printers have suffered. The size of the ejection orifice is a critical design parameter of an ink jet because it determines the size of the droplets of ink that the jet ejects. As a result, the size of the ejection orifice cannot be increased, without sacrificing resolution. Acoustic printing has increased intrinsic reliability because there are no nozzles to clog. As will be appreciated, the elimination of the clogged nozzle failure mode is especially relevant to the reliability of large arrays of ink ejectors, such as page width arrays comprising several thousand separate ejectors. Furthermore, small ejection orifices are avoided, so acoustic printing can be performed with a greater variety of inks than conventional ink jet printing, including inks having higher viscosities and inks containing pigments and other particulate components. It has been found that acoustic ink printers embodying printheads comprising acoustically illuminated spherical focusing lenses can print precisely positioned pixels (i.e., picture elements) at resolutions which are sufficient for high quality printing of relatively complex images. It also has been discovered that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing, (2) matrix configured ejector arrays for matrix printing, and (3) several different types of pagewidth ejector arrays, ranging from single row, sparse arrays for hybrid forms of parallel/serial printing to multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), but in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. Nos. 4,308,547, 4,697, 195, 5,028,937, 5,041,849, 4,751,529, 4,751,530, 4,751,534, 4,801,953, and U.S. Pat. No. 4,797,693, the disclosures of each of which are totally incorporated herein by reference. The use of focused acoustic beams to eject droplets of controlled diameter and velocity from a free-liquid surface is also described in *J. Appl. Phys.*, vol. 65, no. 9 (May 1, 1989) and references therein, the disclosure of which is totally incorporated herein by reference.

U.S. Pat. No. 5,601,023 (Hale et al.), the disclosure of which is totally incorporated herein by reference, discloses the printing of an image on a medium by means of a computer driven printer using an ink composition comprising heat activated dye solids, without activating the dye solids during the process of printing onto the medium. The image is transferred from the medium to the object on which the image is to appear permanently by applying sufficient heat and pressure to the medium to activate the dye and transfer the image to the object. The liquid form of the ink composition uses a liquid carrier and an emulsifying enforcing agent that has an affinity for the dye. The emulsifying enforcing agent shields the heat activated dye both prior to and during the printing process. The emulsifying enforcing agent can be, among several others, an anionic sarcosinate surfactant.

U.S. Pat. No. 5,462,592 (Murakami et al.), the disclosure of which is totally incorporated herein by reference, discloses an aqueous ink composition containing a water soluble dye composed of an anionic dye component and a cationic dye counterion, and an anionic additive composed of an anionic additive component and a cationic additive counterion. The cationic additive counterion may be one of a lithium cation, a quaternary ammonium cation, or a quaternary phosphonium cation, with the amount of the anionic additive being 0.2 weight percent or more of the total weight of the aqueous ink composition. One specific ink composition disclosed contains C.I. Direct Red 227, glycerin, diethylene glycol, thiodiglycol, tetraethyl phosphonium salt of lauroyl sarcosine, sodium dehydroacetate, and ion exchanged water.

U.S. Pat. No. 5,380,358 (Aoki et al.), the disclosure of which is totally incorporated herein by reference, discloses an ink that contains a recording agent and a liquid medium for dissolving or dispersing the recording agent, said ink being characterized in that the ink contains 0.01 to 50 parts per million of a chelating agent based on the total weight of the ink. The ink can also contain an additional solvent, including those such as N-acyl-sarcosinate.

U.S. Pat. No. 5,080,716 (Aoki et al.), the disclosure of which is totally incorporated herein by reference, discloses an ink comprising a recording agent and a liquid medium capable of dissolving or dispersing the recording agent, wherein the ink contains a compound of the formula

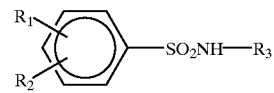

wherein $R_1$ and $R_2$ each represent a group selected from a hydrogen atom, an alkyl group, a hydroxyl group, and a carboxyl group, and $R_3$ represents a monohydric hydroxyalkyl group. The ink is suitably used for ink jet recording. The ink can also contain an organic solvent, including surface active agents such as N-acyl-sarcosinate.

While known compositions and processes are suitable for their intended purposes, a need remains for improved ink compositions for ink jet printing. In addition, a need remains for ink compositions that exhibit quick drying characteristics. Further, a need remains for ink compositions that exhibit good penetration of printing substrates. Additionally, a need remains for ink compositions that exhibit reduced edge raggedness and MFLEN. There is also a need for ink compositions that, when printed adjacent to another ink of a different color, exhibit reduced intercolor bleed. In addition, there is a need for ink compositions with biocidal characteristics to inhibit growth of bacteria, fungus, and the like therein.

SUMMARY OF THE INVENTION

The present invention is directed to an ink composition comprising water, a colorant, and an undecylenoyl sarcosinate salt.

DETAILED DESCRIPTION OF THE INVENTION

The inks of the present invention contain an aqueous liquid vehicle. The liquid vehicle can consist solely of water, or it can comprise a mixture of water and a water soluble or water miscible organic component, such as ethylene glycol, propylene glycol, diethylene glycol, glycerine, dipropylene glycol, polyethylene glycol, polypropylene glycol, amides, ethers, urea, substituted ureas, carboxylic acids and their salts, esters, alcohols, organosulfides, organosulfoxides, sulfones (such as sulfolane), alcohol derivatives, carbitol, butyl carbitol, cellusolve, tripropylene glycol monomethyl ether, ether derivatives, amino alcohols, ketones, N-methylpyrrolidinone, 2-pyrrolidinone, cyclohexylpyrrolidone, hydroxyethers, sulfoxides, lactones, polyelectrolytes, methyl sulfonylethanol, imidazole, betaine, and other water soluble or water miscible materials, as well as mixtures thereof. When mixtures of water and water soluble or miscible organic liquids are selected as the liquid vehicle, the water to organic ratio typically ranges from about 100:0 to about 30:70, and preferably from about 97:3 to about 40:60. The non-water component of the liquid vehicle generally serves as a humectant or cosolvent which has a boiling point higher than that of water (100° C.). In the ink compositions of the present invention, the liquid vehicle is typically present in an amount of from about 80 to about 99.9 percent by weight of the ink, and preferably from about 90 to about 99 percent by weight of the ink, although the amount can be outside these ranges.

The inks for the present invention also contain a colorant. The colorant can be a dye, a pigment, or a mixture thereof. Examples of suitable dyes include anionic dyes, cationic dyes, nonionic dyes, zwitterionic dyes, and the like. Specific examples of suitable dyes include Food dyes such as Food Black No. 1, Food Black No. 2, Food Red No. 40, Food Blue No. 1, Food Yellow No. 7, and the like, FD & C dyes, Acid Black dyes (No. 1, 7, 9, 24, 26, 48, 52, 58, 60, 61, 63, 92, 107, 109, 118, 119, 131, 140, 155, 156, 172, 194, and the like), Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like), Acid Yellow dyes (No. 3, 7, 17, 19, 23, 25, 29, 38, 42, 49, 59, 61, 72, 73, 114, 128, 151, and the like), Direct Black dyes (No. 4, 14, 17, 22, 27, 38, 51, 112, 117, 154, 168, and the like), Direct Blue dyes (No. 1, 6, 8, 14, 15, 25, 71, 76, 78, 80, 86, 90, 106, 108, 123, 163, 165, 199, 226, and the like), Direct Red dyes (No. 1, 2, 16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), anthraquinone dyes, monoazo dyes, disazo dyes, phthalocyanine derivatives, including various phthalocyanine sulfonate salts, aza(18)annulenes, formazan copper complexes, triphenodioxazines, Bernacid Red 2BMN; Pontamine Brilliant Bond Blue A; Pontamine; Caro direct Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red H8B (Reactive Red 31), available from ICI America; Pylam Certified D&C Red #28 (Acid Red 92), available from Pylam; Direct Brilliant Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc.; Neozapon Red 492 (BASF); Savinyl Blue GLS (Sandoz); Luxol Blue MBSN (Morton-Thiokol); Basacid Blue 750 (BASF); Bernacid Red, available from Berncolors, Poughkeepsie, N.Y.; Pontamine Brilliant Bond Blue; Berncolor A.Y. 34; Telon Fast Yellow 4GL-175; BASF Basacid Black SE 0228; the Pro-Jet® series of dyes available from ICI, including Pro-Jet® Yellow I (Direct Yellow 86), Pro-Jet® Magenta I (Acid Red 249), Pro-Jet® Cyan I (Direct Blue 199), Pro-Jet® Black I (Direct Black 168), Pro-Jet® Yellow 1-G (Direct Yellow 132), Aminyl Brilliant Red F-B, available from Sumitomo Chemical Company (Japan), the Duasyn® line of "salt-free" dyes available from Clariant Corp., Charlotte, N.C., such as Duasyn® Direct Black HEF-SF (Direct Black 168), Duasyn® Black RL-SF (Reactive Black 31), Duasyn® Direct Yellow 6G-SF VP216 (Direct Yellow 157), Duasyn® Brilliant Yellow GL-SF VP220 (Reactive Yellow 37), Duasyn® Acid Yellow XX-SF LP413 (Acid Yellow 23), Duasyn® Brilliant Red F3B-SF VP218 (Reactive Red 180), Duasyn® Rhodamine B-SF VP353 (Acid Red 52), Duasyn® Direct Turquoise Blue FRL-SF VP368 (Direct Blue 199), Duasyn® Acid Blue AE-SF VP344 (Acid Blue 9), Orasol Red G (Ciba-Geigy); Direct Brilliant Pink B (Crompton-Knolls); Aizen Spilon Red C-BH (Hodogaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Aizen Spilon Yellow C-GNH (Hodogaya Chemical Company); Sirius Supra Yellow GD 167; Cartasol Brilliant Yellow 4GF (Sandoz); Pergasol Yellow CGP (Ciba-Geigy); Orasol Black RL (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc A (Morton-Thiokol); Diazol Black RN Quad (ICI); Orasol Blue GN (Ciba-Geigy); Sevron Blue 5GMF (ICI); various Reactive dyes, including Reactive Black dyes, Reactive Blue dyes, Reactive Red dyes, Reactive Yellow dyes, and the like, as well as mixtures thereof. The dye is present in the ink composition in any desired or effective amount, typically from about 0.05 to about 15 percent by weight of the ink, preferably from about 0.1 to about 10 percent by weight of the ink, and more preferably from about 1 to about 5 percent by weight of the ink, although the amount can be outside of these ranges.

Examples of suitable pigments include various carbon blacks such as channel black, furnace black, lamp black, and the like. Colored pigments include red, green, blue, brown, magenta, cyan, and yellow particles, as well as mixtures thereof. Illustrative examples of magenta pigments include 2,9-dimethyl-substituted quinacridone and anthraquinone dye, identified in the Color Index as CI 60710, CI Dispersed Red 15, a diazo dye identified in the Color Index as CI 26050, Cl Solvent Red 19, and the like. Illustrative examples of suitable cyan pigments include copper tetra-4-(octadecyl sulfonamido) phthalocyanine, X-copper phthalocyanine pigment, listed in the Color Index as CI 74160, CI Pigment Blue, and Anthradanthrene Blue, identified in the Color Index as CI 69810, Special Blue X-2137, and the like. Illustrative examples of yellow pigments that can be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Permanent Yellow FGL, and the like. Additional examples of pigments include Raven® 5250, Raven® 5750, Raven® 3500 and other similar carbon black products available from Columbia Company, Regal® 330, Black Pearl® L, Black Pearl® 1300, and other similar carbon black products available from Cabot Company, Degussa carbon blacks such as Color Black® series, Special Black® series, Printtex® series and Derussol® carbon black dispersions available from Degussa Company, Hostafine® series such as Hostafine® Yellow GR (Pigment 13), Hostafine® Yellow (Pigment 83), Hostafine® Red FRLL (Pigment Red 9), Hostafine® Rubine F6B (Pigment 184), Hostafine® Blue 2G (Pigment Blue 15:3), Hostafine® Black T (Pigment Black 7), and Hostafine® Black TS (Pigment Black 7), available from Clariant Corp., Charlotte, N.C., Normandy Magenta RD-2400 (Paul Uhlich), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2G01 (Clariant Corp., Charlotte, N.C.), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange 6 (Aldrich), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow F6 1 (Clariant Corp., Charlotte, N.C.), Novoperm Yellow FG1 (Clariant Corp., Charlotte, N.C.), Permanent Yellow YE 0305 (Paul Uhlich), Lumogen Yellow D0790 (BASF), Suco-Gelb L1250 (BASF), Suco-Yellow D1355 (BASF), Hostaperm Pink E (Clariant Corp., Charlotte, N.C.), Fanal Pink D4830 (BASF), Cinquasia Magenta (DuPont), Lithol Scarlet D3700 (BASF), Tolidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company)), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), CAB-O-JET 200 hydrophilic carbon black (Cabot Corp.), CAB-O-JET 300 hydrophilic carbon black (Cabot Corp.), and the like. Additional suitable commercially available pigment dispersions include the Hostafines available from Clariant Corp., Charlotte, N.C., including Hostafine Yellow HR and Hostafine Blue B2G, as well as dispersions available from BASF, including Disperse Black 00-6607, Luconyl Yellow 1250, Basoflex Pink 4810, Luconyl Blue 7050, and the like. Other pigments can also be selected. Preferably, the pigment particle size is as small as possible to enable a stable colloidal suspension of the particles in the liquid vehicle and to prevent clogging of the ink channels when the ink is used in a thermal ink jet printer. Preferred particle average diameters are generally from about 0.001 to about 5 microns, and more preferably from about 0.1 to about 1 micron, although the particle size can be outside these ranges. Within the ink compositions of the present invention, the pigment is present in any effective amount to achieve the desired degree of coloration. Typically, the pigment is present in an amount of from about 0.1 to about 8 percent by weight of the ink, and preferably from about 2 to about 7 percent by weight of the ink, although the amount can be outside these ranges.

The ink compositions of the present invention also contain an undecylenoyl sarcosinate salt. The undecylenoyl sarcosinate salt can be prepared by any desired or suitable process. For example, undecylenic acid and sarcosine can be combined, typically in approximately equimolar amounts, followed by refluxing, typically at temperatures of from about 150 to about 300° C., for a period of time typically from about 1 to about 2 hours to yield the amide form. Thereafter, the salt can be formed by reacting the amide form with any desired base containing the desired cation, such as sodium hydroxide, potassium hydroxide, ammonium hydroxide, choline hydroxide, protonated triethanolamine, tris(hydroxymethyl)ammonium hydroxide, or the like, as well as mixtures thereof, to yield the undecylenoyl sarcosinate salt. The reaction scheme is as follows, using sodium hydroxide as an example of the base:

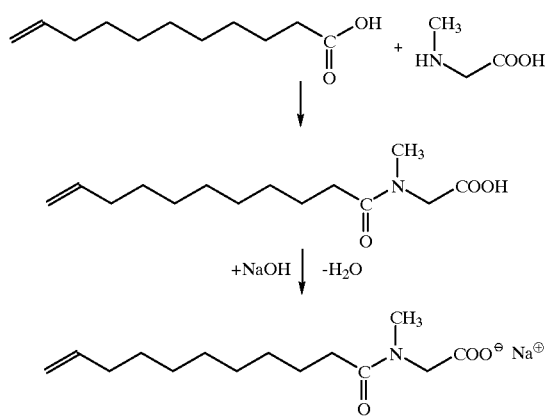

The undecylenoyl sarcosinate salt is present in the ink in any desired or effective amount, typically from about 0.1 to about 10 percent by weight of the ink, preferably from about 0.5 to about 2 percent by weight of the ink, and more preferably from about 0.8 to about 1.2 percent by weight of the ink, although the amount can be outside of these ranges.

While not being limited to any particular theory, it is believed that the undecylenoyl sarcosinate salt imparts to the ink both surfactant characteristics and biocidal characteristics. In addition, it is believed that the undecylenoyl sarcosinate salt has superior safety characteristics compared to other known or commercially available biocides.

Other optional additives to the inks include biocides such as Dowicil 150, 200, and 75, benzoate salts, sorbate salts, and the like, present in an amount of from about 0.0001 to about 4 percent by weight of the ink, and preferably from about 0.01 to about 2.0 percent by weight of the ink, pH controlling agents such as acids or bases, phosphate salts, carboxylates salts, sulfite salts, amine salts, and the like, present in an amount of from 0 to about 1 percent by weight of the ink and preferably from about 0.01 to about 1 percent by weight of the ink, or the like.

One example of an additive to the inks is a polymeric additive consisting of two polyalkylene oxide chains bound to a central bisphenol-A-type moiety. This additive is of the formula

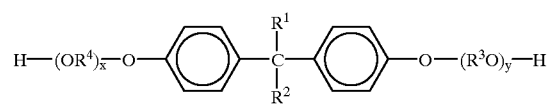

wherein $R^1$ and $R^2$ are independently selected from the group consisting of hydrogen, alkyl groups with from 1 to about 8 carbon atoms, such as methyl, ethyl, propyl, and the like, and alkoxy groups with from 1 to about 8 carbon atoms, such as methoxy, ethoxy, butoxy, and the like, $R^3$ and $R^4$ are independently selected from the group consisting of alkyl groups with from 1 to about 4 carbon atoms, and x and y are each independently a number of from about 100 to about 400, and preferably from about 100 to about 200. Generally, the molecular weight of the polyalkylene oxide polymer is from about 14,000 to about 22,000, and preferably from about 15,000 to about 20,000, although the molecular weight can be outside this range. Materials of this formula are commercially available; for example, Carbowax M20, a polyethylene oxide/bisphenol-A polymer of the above formula with a molecular weight of about 18,000, available from Union Carbide Corporation, Danbury, Conn., is a suitable polymeric additive for the inks of the present invention. In addition, compounds of the above formula can be prepared by the methods disclosed in *Polyethers,* N. G. Gaylord, John Wiley & Sons, New York (1963) and "Laboratory Synthesis of Polyethylene Glycol Derivatives," J. M. Harris, *J. Molecular Science—Rev. Macromol. Chem. Phys.,* C25(3), 325–373 (1985), the disclosures of each of which are totally incorporated herein by reference. The polyalkylene oxide additive is generally present in the ink in an amount of at least about 1 part per million by weight of the ink. Typically, the polyalkylene oxide additive is present in amounts of up to 1 percent by weight of the ink, and preferably in amounts of up to 0.5 percent by weight of the ink; larger amounts of the additive may increase the viscosity of the ink beyond the desired level, but larger amounts can be used in applications wherein increased ink viscosity is not a problem. Inks containing these additives are disclosed in U.S. Pat. No. 5,207,825, the disclosure of which is totally incorporated herein by reference.

The ink compositions are generally of a viscosity suitable for use in thermal ink jet printing processes. At room temperature (i.e., about 25° C.), typically, the ink viscosity is no more than about 10 centipoise, and preferably is from about 1 to about 5 centipoise, more preferably from about 1 to about 4 centipoise, although the viscosity can be outside this range, particularly for applications such as acoustic ink jet printing.

Ink compositions of the present invention can be of any suitable or desired pH. For some embodiments, such as thermal ink jet printing processes, typical pH values are from about 3 to about 11, preferably from about 5 to about 10, and more preferably from about 6 to about 8.5, although the pH can be outside of these ranges.

Ink compositions suitable for ink jet printing can be prepared by any suitable process. Typically, the inks are prepared by simple mixing of the ingredients. One process entails mixing all of the ink ingredients together and filtering the mixture to obtain an ink. Inks can be prepared by mixing the ingredients, heating if desired, and filtering, followed by adding any desired additional additives to the mixture and mixing at room temperature with moderate shaking until a homogeneous mixture is obtained, typically from about 5 to about 10 minutes. Alternatively, the optional ink additives can be mixed with the other ink ingredients during the ink preparation process, which takes place according to any desired procedure, such as by mixing all the ingredients, heating if desired, and filtering.

The present invention is also directed to a process which entails incorporating an ink of the present invention into an ink jet printing apparatus and causing droplets of the ink to be ejected in an imagewise pattern onto a recording sheet. In one preferred embodiment, the printing apparatus employs a thermal ink jet process wherein the ink in the nobles is selectively heated in an imagewise pattern, thereby causing droplets of the ink to be ejected in imagewise pattern. In another preferred embodiment, the printing apparatus employs an acoustic ink jet process, wherein droplets of the ink are caused to be ejected in imagewise pattern by acoustic beams.

Any suitable substrate or recording sheet can be employed, including plain papers such as Xerox® 4024 papers, Xerox® Image Series papers, Courtland 4024 DP paper, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Sodium n-undecanoyl sarcosinate is prepared by admixing equimolar amounts of undecylenic acid and sarcosine and refluxing the mixture at about 220° C. for about 1.5 hours. The product thus obtained is then reacted with sodium hydroxide to yield sodium n-undecanoyl sarcosinate.

EXAMPLE II

An ink composition is prepared by simple mixing of the following ingredients:

| Ingredient | Supplier | Amount (grams) |
| --- | --- | --- |
| deionized water | — | 633.5 |
| sodium n-undecanoyl sarcosinate | Example I | 10 |
| polyethylene oxide* | Polysciences | 0.5 |
| dipropylene glycol | Ashland Chemicals | 140 |
| Acid Blue 9 dye (solids) | Hoechst | 15 |
| PROJET CYAN-1 dye** | Zeneca Colors | 150 |
| deionized water | — | 51 |
| | roll mill 30 minutes | |

*bisphenol-A derivative, molecular weight 18,500, of the formula

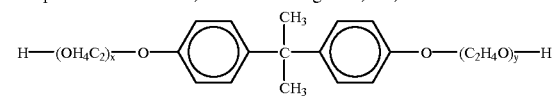

**aqueous solution containing 10 wt. % dye solids in water

The ink thus prepared is filtered through a 0.2 micron, 142 millimeter Gelman Nylaflow filter at 20 pounds per square inch.

The ink composition thus prepared is incorporated into a Hewlett-Packard 1600 ink jet printer and jetted onto Xerox Image Series Elite paper. It is believed that images of high quality will be obtained. It is also believed that upon standing for a period of about 6 months, the level of bacterial and fungal growth in the ink will be comparable to that observed for an ink containing a biocide such as DOWICIL 150/200.

EXAMPLE III

An ink composition is prepared by simple mixing of the following ingredients:

| Ingredient | Supplier | Amount (grams) |
|---|---|---|
| deionized water | — | 431.5 |
| betaine | Esprit | 200 |
| sodium n-undecanoyl sarcosinate | Example I | 10 |
| tris(hydroxymethyl) amino methane | Aldrich Chemical Co. | 5 |
| ethylene diamine tetraacetic acid | Aldrich Chemical Co. | 3.5 |
| PROJET CYAN-1 dye* | Zeneca Colors | 350 |
| | roll mill 30 minutes | |

*aqueous solution containing 10 wt. % dye solids in water

The ink thus prepared is filtered through a 0.2 micron, 142 millimeter Gelman Nylaflow filter at 20 pounds per square inch.

The ink composition thus prepared is incorporated into a Hewlett-Packard 1600 ink jet printer and jetted onto Xerox Image Series Elite paper. It is believed that images of high quality will be obtained. It is also believed that upon standing for a period of about 6 months, the level of bacterial and fungal growth in the ink will be comparable to that observed for an ink containing a biocide such as DOWICIL 150/200.

EXAMPLE IV

An ink composition is prepared by simple mixing of the following ingredients:

| Ingredient | Supplier | Amount (grams) |
|---|---|---|
| deionized water | — | 411.5 |
| tris(hydroxymethyl) amino methane | Aldrich Chemical Co. | 5 |
| ethylene diamine tetraacetic acid | Aldrich Chemical Co. | 3.5 |
| trimethylolpropane | Aldrich Chemical Co. | 70 |
| sodium n-undecanoyl sarcosinate | Example I | 10 |
| betaine | Esprit | 100 |
| PROJET CYAN-1 dye* | Zeneca Colors | 350 |
| deionized water | — | 50 |
| | roll mill 30 minutes | |

*aqueous solution containing 10 wt. % dye solids in water

The ink thus prepared is filtered through a 0.2 micron, 142 millimeter Gelman Nylaflow filter at 20 pounds per square inch.

The ink composition thus prepared is incorporated into a Hewlett-Packard 1600 ink jet printer and jetted onto Xerox Image Series Elite paper. It is believed that images of high quality will be obtained. It is also believed that upon standing for a period of about 6 months, the level of bacterial and fungal growth in the ink will be comparable to that observed for an ink containing a biocide such as DOWICIL 150/200.

EXAMPLE V

An ink composition is prepared by simple mixing of the following ingredients:

| Ingredient | Supplier | Amount (grams) |
|---|---|---|
| deionized water | — | 469 |
| tris(hydroxymethyl) amino methane | Aldrich Chemical Co. | 5 |
| ethylene diamine tetraacetic acid | Aldrich Chemical Co. | 3.5 |
| trimethylolpropane | Aldrich Chemical Co. | 70 |
| sodium n-undecanoyl sarcosinate | Example I | 10 |
| betaine | Esprit | 100 |
| Acid Red 52 dye* | Tricon Colors | 42.5 |
| PROJET MAGENTA-1T dye** | Zeneca Colors | 250 |
| deionized water | — | 50 |
| | roll mill 30 minutes | |

*aqueous solution containing 10 wt. % dye solids in water
**aqueous solution containing 10 wt. % dye solids in water The ink thus prepared is filtered through a 0.2 micron, 142 millimeter Gelman Nylaflow filter at 20 pounds per square inch.

The ink composition thus prepared is incorporated into a Hewlett-Packard 1600 ink jet printer and jetted onto Xerox Image Series Elite paper. It is believed that images of high quality will be obtained. It is also believed that upon standing for a period of about 6 months, the level of bacterial and fungal growth in the ink will be comparable to that observed for an ink containing a biocide such as DOWICIL 150/200.

EXAMPLE VI

An ink composition is prepared by simple mixing of the following ingredients:

| Ingredient | Supplier | Amount (grams) |
|---|---|---|
| deionized water | — | 412 |
| tris(hydroxymethyl) amino methane | Aldrich Chemical Co. | 5 |
| ethylene diamine tetraacetic acid | Aldrich Chemical Co. | 3 |
| trimethylolpropane | Aldrich Chemical Co. | 70 |
| sodium n-undecanoyl sarcosinate | Example I | 10 |
| betaine | Esprit | 100 |
| Acid Yellow 17 dye* | Tricon Colors | 150 |
| PROJET YELLOW 1G dye** | Zeneca Colors | 200 |
| deionized water | — | 50 |
| | roll mill 30 minutes | |

*aqueous solution containing 10 wt. % dye solids in water
**aqueous solution containing 7.5 wt. % dye solids in water The ink thus prepared is filtered through a 0.2 micron, 142 millimeter Gelman Nylaflow filter at 20 pounds per square inch.

The ink composition thus prepared is incorporated into a Hewlett-Packard 1600 ink jet printer and jetted onto Xerox Image Series Elite paper. It is believed that images of high quality will be obtained. It is also believed that upon standing for a period of about 6 months, the level of bacterial and fungal growth in the ink will be comparable to that observed for an ink containing a biocide such as DOWICIL 150/200.

EXAMPLE VII

An ink composition is prepared by simple mixing of the following ingredients:

| Ingredient | Supplier | Amount (grams) |
| --- | --- | --- |
| deionized water | — | 516.6 |
| imidazole | Aldrich Chemical Co. | 200 |
| ethylene diamine tetraacetic acid | Aldrich Chemical Co. | 1 |
| formic acid* (to pH = 7.65) | Aldrich Chemical Co. | 39.88 |
| polyethylene oxide** | Polysciences | 0.5 |
| sodium n-undecanoyl sarcosinate | Example I | 1 |
| Basacid Black X-34 dye*** | BASF | 140 |
| Bayscript Black dye**** | Bayer Mobay | 41.8 |
| deionized water | — | 59.22 |
|  | roll mill 30 minutes |  |

*solution containing 96 wt. % formic acid in water
**bisphenol-A derivative, molecular weight 18,500, of the formula

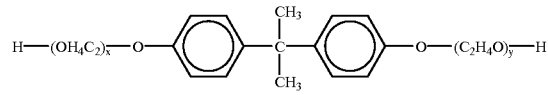

***aqueous solution containing 11.5 wt. % dye solids in water
****aqueous solution containing 10 wt. % dye solids in water The ink thus prepared is filtered through a 0.2 micron, 142 millimeter Gelman Nylaflow filter at 20 pounds per square inch.

The ink composition thus prepared is incorporated into a Hewlett-Packard 1600 ink jet printer and jetted onto Xerox Image Series Elite paper. It is believed that images of high quality will be obtained. It is also believed that upon standing for a period of about 6 months, the level of bacterial and fungal growth in the ink will be comparable to that observed for an ink containing a biocide such as DOWICIL 150/200.

EXAMPLE VIII

An ink composition is prepared by simple mixing of the following ingredients:

| Ingredient | Supplier | Amount (grams) |
| --- | --- | --- |
| deionized water | — | 115.6 |
| polyethylene oxide* | Polysciences | 0.1 |
| sodium n-undecanoyl sarcosinate | Example I | 0.8 |
| ethylene glycol | J. T. Baker | 40 |
| Basacid Black X-34 dye** | BASF | 33.5 |
| Direct Red 227 dye*** | Tricon Colors | 10 |
|  | roll mill 30 minutes |  |

*bisphenol-A derivative, molecular weight 18,500, of the formula

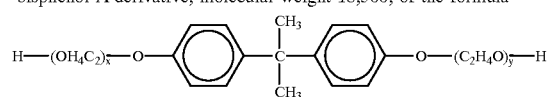

**aqueous solution containing 11.5 wt. % dye solids in water
***aqueous solution containing 10 wt. % dye solids in water The ink thus prepared is filtered through a 0.2 micron, 142 millimeter Gelman Nylaflow filter at 20 pounds per square inch.

The ink composition thus prepared is incorporated into a Hewlett-Packard 1600 ink jet printer and jetted onto Xerox Image Series Elite paper. It is believed that images of high quality will be obtained. It is also believed that upon standing for a period of about 6 months, the level of bacterial and fungal growth in the ink will be comparable to that observed for an ink containing a biocide such as DOWICIL 150/200.

Other embodiments and modifications of the present invention may occur to those of ordinary skill in the art subsequent to a review of the information presented herein; these embodiments and modifications, as well as equivalents thereof, are also included within the scope of this invention.

What is claimed is:

1. An ink composition comprising water, a colorant, and an undecylenoyl sarcosinate salt.

2. An ink composition according to claim 1 wherein the colorant is a dye.

3. An ink composition according to claim 2 wherein the dye is present in the ink in an amount of from about 0.05 to about 15 percent by weight of the ink.

4. An ink composition according to claim 1 wherein the colorant is a pigment.

5. An ink composition according to claim 4 wherein the pigment is present in the ink in an amount of from about 0.1 to about 8 percent by weight of the ink.

6. An ink composition according to claim 1 wherein the undecylenoyl sarcosinate salt is present in the ink in an amount of from about 0.1 to about 10 percent by weight of the ink.

7. An ink composition according to claim 1 wherein the undecylenoyl sarcosinate salt is present in the ink in an amount of from about 0.5 to about 2 percent by weight of the ink.

8. An ink composition according to claim 1 wherein the undecylenoyl sarcosinate salt is present in the ink in an amount of from about 0.8 to about 1.2 percent by weight of the ink.

9. An ink composition according to claim 1 further containing a cosolvent.

10. An ink composition according to claim 9 wherein the cosolvent is ethylene glycol, propylene glycol, diethylene glycol, glycerine, dipropylene glycol, polyethylene glycol, polypropylene glycol, urea, sulfolane, butyl carbitol, cellusolve, tripropylene glycol monomethyl ether, N-methylpyrrolidinone, 2-pyrrolidinone, cyclohexylpyrrolidone, imidazole, betaine, or mixtures thereof.

11. A process which comprises incorporating into an ink jet printing apparatus an ink composition according to claim 1 and causing droplets of the ink to be ejected in an imagewise pattern onto a recording sheet.

12. A process according to claim 11 wherein the colorant is a dye.

13. A process according to claim 11 wherein the colorant is a pigment.

14. A process according to claim 11 wherein the undecylenoyl sarcosinate salt is present in the ink in an amount of from about 0.1 to about 10 percent by weight of the ink.

15. A process according to claim 11 wherein the undecylenoyl sarcosinate salt is present in the ink in an amount of from about 0.5 to about 2 percent by weight of the ink.

16. A process according to claim 11 further containing a cosolvent.

17. A process according to claim 16 wherein the cosolvent is ethylene glycol, propylene glycol, diethylene glycol, glycerine, dipropylene glycol, polyethylene glycol, polypropylene glycol, urea, sulfolane, butyl carbitol, cellusolve, tripropylene glycol monomethyl ether, N-methylpyrrolidinone, 2-pyrrolidinone, cyclohexylpyrrolidone, imidazole, betaine, or mixtures thereof.

18. A process according to claim 11 wherein the printing apparatus employs a thermal ink jet process wherein the ink in the nozzles is selectively heated in an imagewise pattern, thereby causing droplets of the ink to be ejected in imagewise pattern.

19. A process according to claim 11 wherein the printing apparatus employs an acoustic ink jet process, wherein droplets of the ink are caused to be ejected in imagewise pattern by acoustic beams.

20. A process according to claim 11 wherein the recording sheet is paper or transparency material.

* * * * *